United States Patent [19]

Milanov et al.

[11] Patent Number: 4,932,793
[45] Date of Patent: Jun. 12, 1990

[54] LINEAR BEARING

[75] Inventors: Boris D. Milanov; Dimiter I. Yanakiev; Stefan B. Milanov; Elena S. Yanakieva, all of Sofia, Bulgaria

[73] Assignee: V M E I "Lenin", Sofia, Bulgaria

[21] Appl. No.: 365,421

[22] Filed: Jun. 13, 1989

[51] Int. Cl.$^5$ ............................................. F16C 29/06
[52] U.S. Cl. ...................................... 384/43; 464/168
[58] Field of Search ............................ 384/43, 44, 45; 464/168

[56] References Cited

U.S. PATENT DOCUMENTS

| | | | |
|---|---|---|---|
| 3,788,708 | 1/1974 | McCloskey | 384/43 |
| 3,871,722 | 3/1975 | McCloskey | 384/43 |
| 3,884,537 | 5/1975 | McCloskey | 384/43 |
| 4,062,602 | 12/1977 | Nilsson | 384/43 |

Primary Examiner—Lenard A. Footland
Attorney, Agent, or Firm—Herbert Dubno

[57] ABSTRACT

The bearing is intended for incorporation in devices effecting linear motions along axles of round section. It comprises a monolithic prismatic cassette and ball chains, disposed inside continuous two-track grooves. These grooves are machined totally in the thickness of the cassette walls, and the non-working sectors of the ball chains are disposed close to the cassette edges and along said edges. The external surface of the cassette is enclosed by the internal surface of the sleeve which is of identical geometric shape. This design makes possible the increase of the number of ball chains disposed in one wall and, hence, of the load-carrying capacity of the bearing.

3 Claims, 3 Drawing Sheets

LINEAR BEARING

This invention relates to a linear bearing with ball chains, more particularly to a bearing for linear motion along axles of round section, which can find application in machinery, instrument engineering, robotics and other fields of industry.

There are known bearings for linear motion along axles of round section with ball chains made-up of an external cylindrical sleeve and a monolithic polyhedral prismatic cassette. The cassette and the sleeve are provided with respectively formed recesses which form a continuous double-way conveying groove filled with balls which form a ball chain. The working sectors of the ball chain in bearings of such design are machined in the walls of the polyhedral prismatic cassette and, for this purpose, the groove in this sector has a depth corresponding to the ball size. The non-working sectors of the ball chain are in the area of the edges of the cassette and, therefore, the depth of the groove there is reduced and this reduction is compensated by V-shaped slots machined in the internal cylindrical wall of the sleeve opposite to the geometric position of the edges of the cassette. Thus, the one branch of the continuous double-way conveying groove is disposed totally in the cassette wall and the other branch—partially in the cassette wall and partially in the sleeve embracing it, where the V-shaped slots are machined. Thus, both branches of the groove are of different shape.

Moreover, in the area where the ball chain passes from one to the other branch of the groove, i.e. from the working to the non-working sector and vice versa, there is machined a transition step, so that the balls can pass in the V-shaped slot of the sleeve where they perform their parasitic motion.

It follows from the aforementioned that the ball chains in the working and the non-working sector are disposed in two different levels.

A drawback of the described design lies in the reduced load carrying capacity and, hence, the reduced life of the bearing as a result of the irrational disposition of the grooves for the ball chains and, hence, of the balls themselves.

Another design drawback of the described bearing lies in the necessity of machining transition steps in the double-way conveying groove where the balls pass from working to non-working state and vice versa.

Moreover, the described design is not ensured against eventual overturning or slippage of the cassette with respect to the sleeve, and in case of such overturning or slippage the forces are taken up totally by the balls which are in the V-shaped slots of the sleeve, which is a substantial drawback of the design.

A drawback of the described bearing lies also in the variety of the used forms, this requiring diverse machining equipment and, particularly, the different geometric shape of both inscribed one into the other surfaces—the external of the cassette and the internal of the sleeve—result into an excess clearance which increases the overall size of the bearing.

It is therefore a general object of this invention to avoid the aforementioned drawbacks and to develop a linear bearing with ball chains and, particularly, a bearing for linear motion along axles of round section which is featured by increased load-carrying capacity and life at equal overall sizes, which is ensured against overturning and slippage of the cassette and the sleeve one with respect to the other, and is featured by a simplified design and adaptability to manufacture.

This object is achieved by a linear bearing and, more particularly, by a bearing for linear motion along axles of round section, which is made-up of an external cylindrical sleeve which embraces a monolithic polyhedral prismatic cassette, in which there are machined continuous two-track grooves containing balls which form ball chains, and the depth of the grooves in both branches is machined in such a way that the ball chains arranged in them lie in one and the same level and totally in the cassette wall. Within the range of the working sectors of the ball chain, the grooves are pierced with regard to establish a working contact between the balls and the axle. The non-working sectors of the ball chains are disposed close to the edges of the cassette and along said edges, and on both sides of each edge there is one non-working sector of the ball chain, so that their working sectors remain disposed close to the mid-perpendicular of the cassette wall.

The object is also achieved by that the internal surface of the external cylindrical sleeve has a geometric shape identic to the geometric shape of the external surface of the monolithic polyhedral prismatic cassette and, as a result, the ball chains are covered by the plane areas of the identical walls of the internal polyhedral prismatic surface of the sleeve.

The thus built-up linear bearing makes it possible to provide in each wall of the cassette, if necessary, more than one ball chain and, moreover, there is provided a possibility to bevel the sharp edges of the polyhedron, this ensuring a possibility for reducing the overall sizes of the bearing.

The linear bearing according to the invention is featured by an increased load-carrying capacity, resulting from the possibility to incorporate in each wall of the polyhedral prismatic cassette more than one ball chain. On the other hand, the identity of the geometric shape of both inscribed one into the other surfaces—the external surface of the cassette and the internal surface of the sleeve—makes impossible any possibility of overturning or slippage between the sleeve and the cassette since it is hindered by the edges of the polyhedron. Moreover, the identity of both inscibed surfaces provides for a tight contact between them, thus also reducing the overall sizes of the bearing.

The machining of both branches of the groovesfor the ball chains of one and the same depth and shape simplifies the technological process. Moreover, there is thus eliminated the necessity of a transition step in the area where the balls pass from working into non-working state because of the displacement of the ball chains totally in one and the same plane—the cassette wall.

Besides the aforementioned advantages, the linear bearing according to the invention is featured by simple design and good adaptivity to manufacture, and its assembly and disassembly are convenient and easy.

For a better understanding of the invention reference should be made to the accompanying drawings in which there is illustrated and described a preferred embodiment of the invention.

Figure 1:
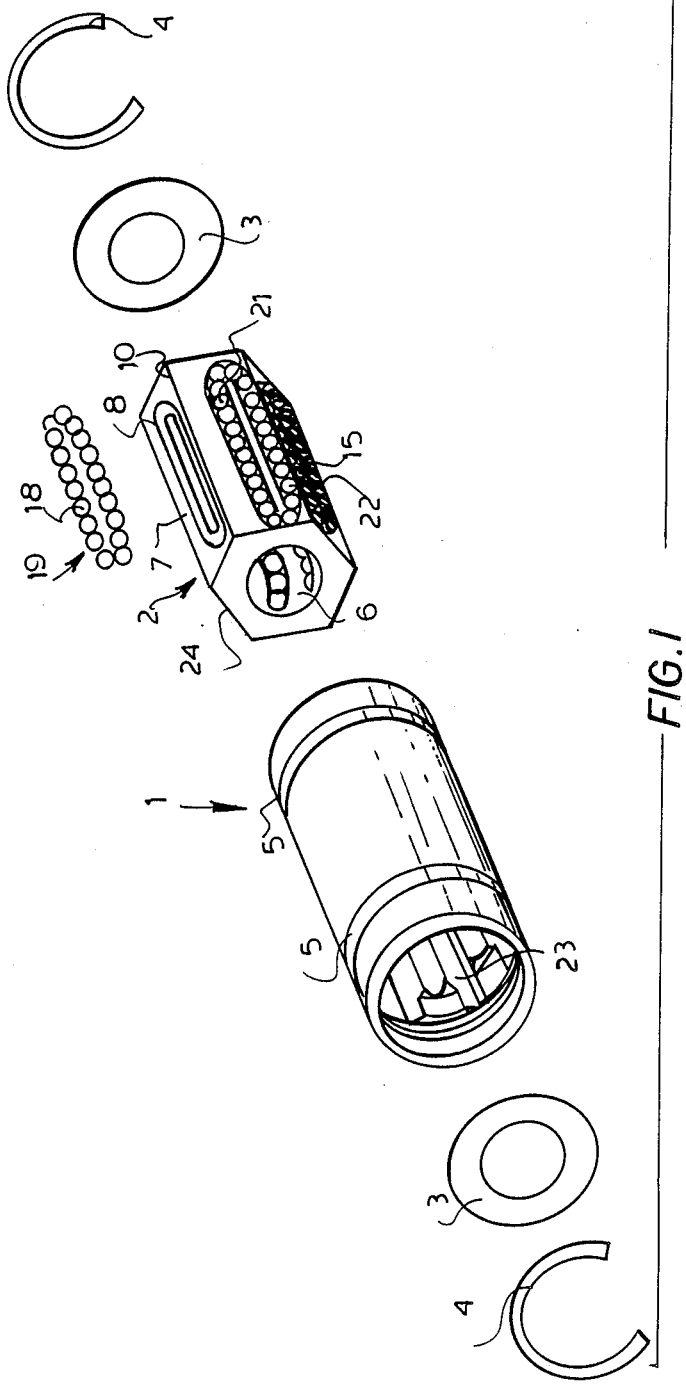
FIG. 1 is an axonometric view of a disassembled linear bearing.

As seen in FIG. 1, the linear bearing consists of an external cylindrical sleeve 1 and a monolithic cassette 2 which is coaxially connected to the sleeve, i.e. when assembling the bearing, the cassette 2 is inserted inside the sleeve 1.

The bearing is reinforced laterally by the limiting discs 3 and the locking rings 4. For limiting the bearing in service, there are provided grooves 5 in both ends of the sleeve 1 in its external surface.

The cassette 2 is shaped as a polyhedral prism. Hence, it is a monolithic, polyhedral prismatic cassette, which is illustrated in FIG. 1 as a monolithic hexahedral prismatic cassette, but it could also be a trihedral, quadrihedral, pentahedral etc. prismatic cassette. The optimum number of faces 7 of cassette 2 is of from 2 to 12 and it is chosen depending on the diameter of the round axle. Most suitable for axles with diameter smaller than 20 mm are trihedral to hexahedral cassettes, and for axles with diameter greater than 20 mm—pentahedral to 12-hedral cassettes.

Figure 2:
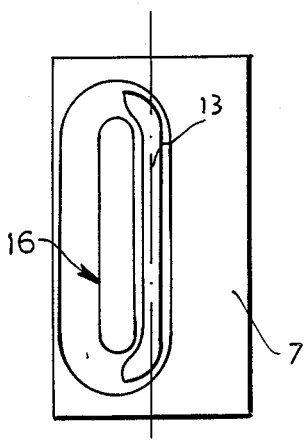
FIG. 2 is a top view of a cassette wal with one ball chain.
Figure 3:
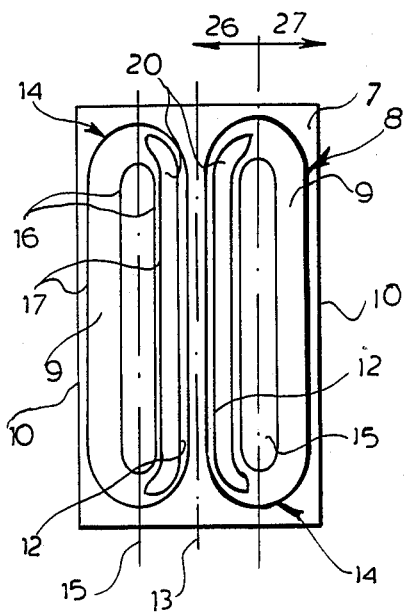
FIG. 3 is a top view of a cassette wall with two ball chains.

The cassette 2 is provided with a central hole 6 intended for the axle of round section (not shown in the figure). After insertion of an axle in the hole 6 there is obtained a complete bearing unit. Each wall 7 of the monolithic polyhedral prismatic cassette 2 contains at least one continuous two-track groove 8, machined lengthwise in the wall 7 of cassette 2. The continuous two-track groove 8 is machined in such a way, that its one linear sector 9 (FIG. 2 and FIG. 3) is disposed close to the edge 10 of cassette 2 along the same. The disposition of the second linear sector 12 of the two-track groove 8 depends on the total number of grooves 8 in the wall 7. Hence, if each wall 7 of cassette 2 contains only one continuous two-track groove 8, the second linear sector 12 is disposed in the mid-perpendicular 13 of wall 7, as shown in FIG. 2. However, if the walls 7 of cassette 2 are provided with two grooves 8 each, the second linear sectors 12 are disposed close to the mid-perpendicular 13 of each wall 7 and symmetrically to both sides of the same, as shown in FIG. 3. Both linear sectors 9 and 12 are connected in their ends by circular sectors 14 and are divided apart by means of the insular part 15, which forms the internal wall 16 of the two-track groove 8, the external wall 17 of which is formed by the thickness of wall 7 of cassette 2. The height of the insular part 15 is the same as that of the wall 7.

Each continuous two-track groove 8 is filled with balls 18 (FIG. 1), which are arranged tightly one to another in the groove forming thus a ball chain 19. The size of the balls and, hence, of the groove depends on the standard size of the bearing, which for its part depends on the diameter of the round axle with which the bearing forms one unit. In principle, the linear bearing can be produced for axles with diameters of from 5 to 150 mm.

The continuous two-track groove 8 can be regarded as composed of two branches: one branch 25 for idle motion and the second branch 26 for working motion of the ball chain 19. At that, the basis of branch 25 of the groove for idle motion is compact, while that for branch 26 of the groove for working motion is a through hole 20.

It becomes thus clear, that the branch 25 of the groove for working motion effects the functions of a working sector of the ball chain 19 thanks to the fact, that through the through hole 20 there is ensured the necessary contact between the ball chain 19 and the round axle.

Thus, it should be understood that the working sectors 21 (FIG. 1) of the ball chain 19 is the position taken up by the balls 18 in the through hole 20 at a given moment of time. Its non-working sector 22, respectively, will be determined by the position taken up by the balls 18 in the remaining portion of groove 8, i.e. the portion outside the through hole 20 in given moment of time.

It should be noted, that the working sector 21, as well as the non-working sector 22 of the ball chain 19 are in one and the same level, and that the necessary difference in the distance of these sectors from the round axle is achieved as a result of transposing the ball chain and of the continuous two-track groove 8, respectively, close to the cassette edge. Thus, each edge of the monolithic polyhedral prismatic cassette 2 is enclosed from both sides by the non-working sectors of the ball chains.

Figure 4:
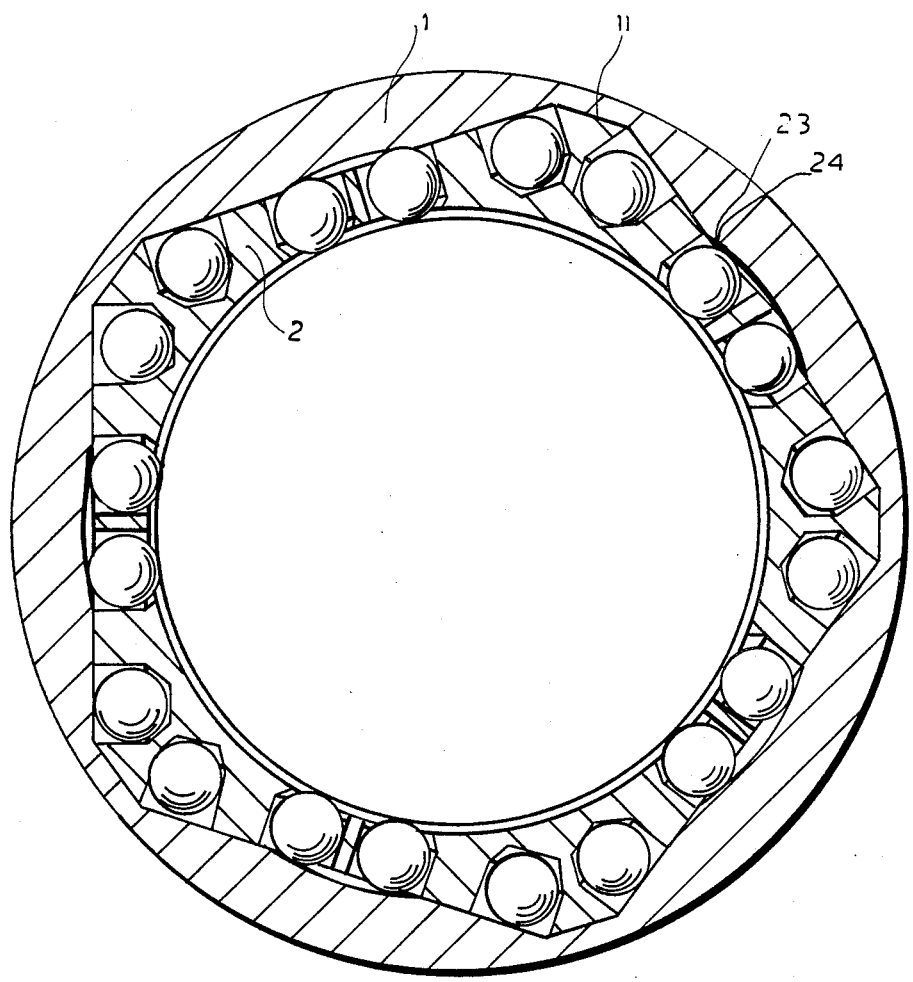
FIG. 4 is a cross-sectional view of a design variant of a bearing with cassette with bevelled edges.

In a preferred embodiment of the cassette 2 (FIG. 4) its edges 10 are beveled, thus forming plane sectors 11. This provides a possibility for reducing the overall size of the cassette and, hence, of the overall sizes of the bearing.

Moreover, according to the invention, the internal surface 23 of the cylindrical sleeve 1 is identical to that of the external surface 24 of the cassette 2. Thus, there is ensured a tight inscribing of both surfaces 23 and 24 one into the other and a covering of the non-working sectors of the ball chain by a plane sector, such as the opposite wall of the internal prismatic surface 23 of sleeve 1. The described inscription of surfaces 23 and 24 makes impossible any overturning or slippage of both basic parts of the bearing—the sleeve 1 and the cassette 2—one with respect to the other.

There are also possible design variants of the linear bearing in which the integrity of the cylindrical shape is violated. More particularly, the bearing can be made-up as a "split 2" one by cutting the cassette 2 and the sleeve 1 through one of the walls 7 in a portion unoccupied by a groove 8.

Another design variant of the linear bearing is the "open" linear bearing intended for mounting onto long axles which requires the use of supporting consoles (not shown in the drawings). In this design variant, the cylindrical sleeve 1 and the monolithic polyhedral prismatic cassette 2 are connected in such a way, that one metal portion of them, in which one ball chain 19 has been incorporated, it taken out. It is possible to use for this type of bearings all types of polyhedral cassettes, with the exception of the trihedral and quadrihedral prismatic cassettes.

The assembly of the aforedescribed linear bearing, according to the invention, is effected as follows:

The continuous two-track grooves 8 are filled with balls. Then, the cassette with the balls arranged in it, which form ball chains, is introduced into the cylindrical sleeve 1, the internal surface of which has been previously shaped as a prism, identical to that of the cassette. Then, there are placed in both ends of the cassette in succession the limiting discs 3 and the locking rings 4. Thus, the bearing is ready for mounting on the round axle. When the bearing is mounted on the axle, the latter comes in contact with the working sector 21 of the ball chain 19, which is limited by the through hole 20, and the axle slips along the balls 18.

We claim:

1. Linear bearing, more particularly bearing for linear motions along axles of round section, consisting of an external cylindrical sleeve, a monolithic prismatic polyhedral cassette inserted into the sleeve, and ball chains disposed within continuous two-track grooves, wherein the continuous two-track grooves (8) are entirely machined in the thickness of the walls (7) of the cassette (2) at an equal depth for the whole groove, so that the ball chains (19) contained in them lie in the same level in the walls (7) of the cassette (2), an at that the non-working sectors (22) of the ball chains (19) are disposed close to the edges (10) of the cassette (2) along the length of said edges (10), and on both sides of each edge (10) there is a non-working sector (22) of the ball chains (19), while the working sectors (21) are disposed close to the midperpendiculars (13) of the walls (7) of cassette (2), the external surface of which (24) is enclosed by the internal surface (23) of the sleeve (1) which is of identical shape.

2. Linear bearing according to claim 1, wherein the ball chains (19) are covered by the plain portions of the identical walls of the internal surface (23) of sleeve (1).

3. Linear bearing according to claim 1, wherein each wall (7) of cassette (2) contains at least one ball chain (19), and the edges (10) of cassette (2) are bevelled.

* * * * *